United States Patent [19]

Murase

[11] Patent Number: 5,045,599
[45] Date of Patent: Sep. 3, 1991

[54] ANTI-ICING COATING COMPOSITIONS
[75] Inventor: Heihachi Murase, Kanagawa, Japan
[73] Assignee: Kansai Paint Company Limited, Kyogo, Japan
[21] Appl. No.: 339,831
[22] Filed: Apr. 18, 1989
[30] Foreign Application Priority Data
   Apr. 27, 1988 [JP] Japan .................. 63-106450
[51] Int. Cl.$^5$ ............................. C09L 83/10
[52] U.S. Cl. .................. 525/102; 525/104; 525/63; 525/124; 525/129
[58] Field of Search ........... 525/104, 102, 67, 129, 525/124; 524/269, 265

[56] References Cited
U.S. PATENT DOCUMENTS

| | | | |
|---|---|---|---|
| 2,470,772 | 5/1949 | Haas | 525/104 |
| 2,934,515 | 4/1960 | Konkle et al. | 525/104 |
| 4,314,043 | 2/1982 | Kojima et al. | 525/102 |
| 4,369,279 | 1/1983 | Emmerich | 524/267 |
| 4,617,057 | 10/1986 | Plueddemann | 106/2 |
| 4,636,324 | 1/1987 | Murase et al. | 252/70 |
| 4,857,593 | 8/1989 | Leung et al. | 525/92 |
| 4,861,667 | 8/1989 | Takayanagi et al. | 428/421 |

Primary Examiner—Melvyn I. Marquis
Assistant Examiner—Ralph Dean, Jr.
Attorney, Agent, or Firm—Armstrong, Nikaido, Marmelstein, Kubovcik & Murray

[57] ABSTRACT

This provides an anti-icing coating composition comprising as vehicle components:
(a) a copolymer having hydroxyl, or hydroxyl and a reactive group other than hydroxyl and comprising as essential monomer components a fluoroolefin and a vinyl monomer having hydroxyl and copolymerizable with the fluoroolefin,
(b) a silicone compound represented by the formula

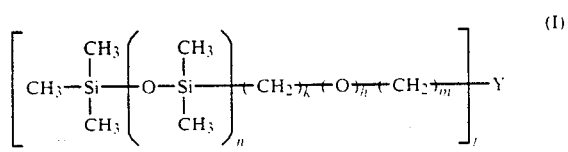

wherein n is an integer of 6 to 300, k is an integer of 0 to 6, h is 0 or 1, m is an integer of 0 to 6, j is 1 or 2, and Y is a) hydroxyl, or b) a group reactive with the hydroxyl or the reactive group in the copolymer (a) and selected from among (i) carboxyl, (ii) epoxy and (iii) a monovalent or bivalent group containing one or two free isocyanate groups, and
(c) a polyisocyanate compound.

12 Claims, 1 Drawing Sheet

FIG. 1

ANTI-ICING COATING COMPOSITIONS

BACKGROUND OF THE INVENTION

The present invention relates to novel coating compositions for preventing icing.

Attempts have heretofore been made to prevent articles from icing by coating the articles with various coating compositions to form coatings having reduced susceptibility to icing. Silicone resins, fluorocarbon resins, rubbers and the like are known as coating materials. Although these coating materials give the surfaces of articles more or less reduced susceptibility to icing, they are unable to completely preclude strong adhesion of ice due to hydrogen bonds. Accordingly, we conducted basic research on the mechanism of icing and already proposed an anti-icing composition which comprises an alkali metal compound capable of breaking hydrogen bonds and an organopolysiloxane resin in combination therewith and which is more effective for preventing icing than the conventional coating materials (see Unexamined Japanese Patent Publication SHO 59-25868).

Although the proposed organopolysiloxane resin composition is almost satisfactorily usable for preventing icing, the composition has the drawback of necessitating a primer for application because the composition is low in adhesion to the article to be coated.

To obtain improved adhesion, we proposed anti-icing organic coating compositions prepared by adding a perfluoroalkyl-containing (meth)acrylic monomer to a synthetic resin coating composition of the organic solvent type such as an acrylic resin, polyurethane resin, epoxy resin or alkyd resin coating composition (Unexamined Japanese Patent Publication SHO 61-23656). However, these compositions, although exhibiting good adhesion to articles, has the problem that the coating is brittle, has poor physical properties and is not satisfactory in its ability to prevent icing.

Accordingly, an object of the present invention is to provide an anti-icing coating composition which is excellent in anti-icing property, adhesion to the article to be coated therewith and the physical properties of the coating prepared therefrom.

Another object of the invention is to provide an anti-icing coating composition capable of forming coatings which retain an excellent anti-icing property for a prolonged period of time.

These and other objects of the invention will become apparent from the following description.

SUMMARY OF THE INVENTION

The present invention provides an anti-icing coating composition comprising as vehicle components:
(a) a copolymer having hydroxyl, or hydroxyl and a reactive group other than hydroxyl and comprising as essential monomer components a fluoroolefin and a vinyl monomer having hydroxyl and copolymerizable with the fluoroolefin,
(b) a silicone compound represented by the formula (I)

wherein n is an integer of 6 to 300, k is an integer of 0 to 6, h is 0 or 1, m is an integer of 0 to 6, j is 1 or 2, and Y is a) hydroxyl, or b) a group reactive with the hydroxyl or the reactive group in the copolymer (a) and selected from among carboxyl, epoxy and a monovalent or bivalent group containing one or two free isocyanate groups, and
(c) a polyisocyanate compound.

DETAILED DESCRIPTION

Our research has revealed that the composition comprising the copolymer (a), the silicone compound (b) and the polyisocyanate compound (c) has exceedingly high ability to prevent icing and forms coatings having satisfactory physical properties and exhibiting high adhesion to the coated article. For example, the coating formed from the composition of the invention has initial icing strength of as small as up to about 1.2 kg/cm$^2$ and is superior to the coatings of other compositions which are known in the art to be small in initial icing strength. In fact, the above value is much smaller than the corresponding values of polytetrafluoroethylene, ethylene fluoride-vinyl ether copolymer and silicone oil which are about 1.8 kg/cm$^2$, about 5.0 kg/cm$^2$ and about 1.5 kg/cm$^2$, respectively. Moreover, the coating of the present composition retains the excellent anti-icing property over a prolonged period of time. Additionally, the present composition exhibits good adhesion to the coated article, and the coating formed is also outstanding in properties such as impact resistance, bending resistance, abrasion resistance and weather resistance.

Our research has also revealed that the foregoing objects of the invention can be fulfilled not only by the composition comprising a copolymer (a), a silicone compound (b) and a polyisocyanate compound (c) but also by a composition comprising in combination with a polyisocyanate compound (c), a graft copolymer (d) which is prepared by reacting a silicone compound (b) with a copolymer (a). Accordingly, the compositions of the invention include an anti-icing coating composition comprising the graft copolymer (d) of a copolymer (a) with a silicone compound (b), and a polyisocyanate compound (c).

The component (a) of the present composition, i.e. the copolymer (a), comprises a fluoroolefin as one of its monomer components. Examples of useful fluoroolefins are hexafluoropropene, tetrafluoroethylene, monochlorotrifluoroethylene, dichlorodifluoroethylene, 1,2-difluoroethylene, vinylidene fluoride, monofluoroethylene and the like. These compounds can be used individually, or at least two of them are usable in combination. Of these olefins, tetrafluoroethylene and monochlorotrifluoroethylene are especially desirable in view of copolymerizability.

Examples of vinyl monomers having hydroxyl and copolymerizable with the fluoroolefin to form the component (a) of the invention are hydroxyl-containing vinyl ethers such as hydroxyethyl vinyl ether, hydroxypropyl vinyl ether, hydroxybutyl vinyl ether, hydroxyhexyl vinyl ether and hydroxypentyl vinyl ether; hydroxyl-containing (meth)acrylates such as 2-hydroxyethyl acrylate, 2-hydroxyethyl methacrylate, hydroxypropyl acrylate, hydroxypropyl methacrylate, hydroxybutyl acrylate and hydroxybutyl methacrylate;

etc. These compounds can be used individually, or at least two of them are usable in admixture. Among these examples, hydroxyl-containing vinyl ethers having a hydroxyalkyl ether group with 2 to 6 carbon atoms are especially desirable from the viewpoint of copolymerizability.

While the component (a) of the present composition consists essentially of a fluoroolefin and a vinyl monomer having hydroxyl and copolymerizable therewith, other monomers may be copolymerized with these monomers when required. Examples of such monomers are vinyl ethers having an alkyl group such as methyl, ethyl, propyl, isobutyl, n-butyl, hexyl, octyl, decyl or lauryl, or an alicyclic group such as cyclobutyl, cyclopentyl, cyclohexyl, adamantyl or bornyl; alkyl (meth)acrylates having an alkyl with 1 to 18 carbon atoms; glycidyl (meth)acrylate; vinyl esters such as vinyl acetate, vinyl propionate, vinyl butyrate, vinyl pivalate, vinyl caproate, vinyl laurate, vinyl ester of versatic acid and vinyl cyclohexanecarboxylate; α-olefins such as ethylene, propylene, isobutylene and butene-1; etc. These compounds can be used individually, or at least two of the them are usable in admixture. Among these monomers, it is desirable to use vinyl ethers having an alkyl ether group with 2 to 6 carbon atoms and cyclohexyl vinyl ether in view of copolymerizability.

The copolymer (a) has the hydroxyl due to the presence of the hydroxyl-containing vinyl monomer or may have the hydroxyl and a reactive group other than the hydroxyl. Examples of such reactive groups other than hydroxyl are carboxyl, epoxy and the like. Carboxyl can be introduced into the copolymer (a), for example, by reacting a dibasic acid anhydride with the hydroxyl of the copolymer (a) of fluoroolefin and hydroxyl-containing vinyl monomer or with the hydroxyl of the copolymer (a) obtained by copolymerizing these monomers with other monomer. Epoxy can be introduced into the copolymer (a), for example, by preparing the copolymer (a) using as a monomer component thereof an epoxy-containing vinyl monomer such as glycidyl (meth)acrylate.

To prepare the copolymer (a), the monomers are used preferably in the following proportions.

| Fluoroolefin | 20-80 mole % |
|---|---|
| Hydroxyl-containing vinyl monomer | 1-80 mole % |
| Other monomer | 0-79 mole % |

More preferably, these monomers are used in the proportion of fluoroolefin 30-70 mole %, hydroxyl-containing vinyl monomer 3-70 mole % and other monomer 0-65 mole %.

The reaction for preparing the copolymer (a) is conducted usually in an organic solvent at a temperature of about −20° to about 150° C. at atmospheric pressure to an elevated pressure of up to about 30 kg/cm²G using usually about 0.01 to about 5 parts by weight of a polymerization initiator per 100 parts by weight of the combined amount of monomers. The copolymer (a) is generally 2000 to 100000, preferably 5000 to 60000, in number average molecular weight. If the molecular weight is smaller than the above range, the coating tends to have lower water resistance and impaired properties, whereas if it is greater than the above range, the copolymer tends to exhibit an excessively higher viscosity and becomes inconvenient to handle. The copolymer (a) preferably has a hydroxy value of about 30 to about 400 mg KOH/g, more preferably 40 to 300 mg KOH/g. When the hydroxy value is smaller than the above range, the copolymer will not be fully curable, rendering the coating insufficiently crosslinkable, whereas if the value is greater than the above range, the coating tends to be lower in water resistance and properties.

The component (b) of the present composition is a silicone compound represented by the following formula (I).

wherein n is an integer of 6 to 300, k is an integer of 0 to 6, h is 0 or 1, m is an integer of 0 to 6, j is 1 or 2, and Y is (a) hydroxyl, or (b) a group reactive with the hydroxyl or the reactive group in the copolymer (a) and selected from among carboxyl, epoxy and a monovalent or bivalent group containing one or two free isocyanate groups.

The component (b) has a structural portion (hereinafter referred to as "polymethylsiloxane chain") represented by the formula wherein n is as defined above. This chain imparts a slipping property and reduced surface tension to the coating and is effective for preventing adhesion of ice thereto.

The component (b) also has a group represented by Y in the formula (I) in addition to the polymethylsiloxane chain. The group Y is hydroxyl, or a group which is selected from among carboxyl, epoxy and a monovalent or bivalent group containing one or two free isocyanate groups and which is reactive with the hydroxyl or other reactive group in the copolymer (a). Thus, it is essential that the component (b) have hydroxyl or a group reactive with the hydroxyl or other group in the copolymer (a). The component (b) is reacted in coatings with the component (a) by direct grafting and/or coupled with the component (a) by means of a polyisocyanate compound as the component (c) to result in the coatings having an improved anti-icing property, ability to retain this property, enhanced adhesion to the article to be coated and improved physical properties. Table 1 shows the reactive groups of the component (a) and the groups contained in the component (b) and reactive with these respective groups.

TABLE 1

| Reactive groups in component (a) | Reactive groups in component (b) |
|---|---|
| Hydroxyl | Isocyanate |
|  | Carboxyl |
| Carboxyl | Epoxy |
|  | Hydroxyl |
| Epoxy | Carboxyl |

Of the combinations of reactive groups given in Table 1 above, the combination of hydroxyl in (a) and isocyanate in (b), and the combination of carboxyl in (a) and epoxy in (b) are suitable in view of the reactivity and ease of preparation.

Examples of preferred silicone compounds (b) wherein Y is hydroxyl, carboxyl or epoxy are α-trimethyl-ω-[3-(2-carboxyethoxy)propyl]polydimethylsiloxane, α-trimethyl-ω-[3-(carboxymethoxy)propyl]polydimethylsiloxane, α-trimethyl-ω-[3-(glycidyloxy)propyl]-polydimethylsiloxane, α-trimethyl-ω-[3-(2-hydroxyethoxy)propyl] polydimethylsiloxane, α-trimethyl-ω-[3-(hydroxymethoxy)propyl]polydimethylsiloxane, α-trimethyl-ω-[4-(2-hydroxyethoxy)butyl]polydimethylsiloxane and the like. Among these, preferable are α-trimethyl-ω-[3-(carboxymethoxy)propyl]polydimethylsiloxane, α-trimethyl-ω-[3-glycidyloxy)propyl]polydimethylsiloxane, α-trimethyl-ω-[3-hydroxymethoxy)propyl]polydimethylsiloxane, etc.

When Y is an isocyanate-containing group, this group is monovalent or bivalent and may contain one or two free isocyanate groups. Compounds (b) wherein Y is an isocyanate-containing group can be prepared from a compound having the polymethylsiloxane chain and an active hydrogen-containing group and represented by the formula

(II)

wherein Z is the active hydrogen-containing group, and n, k, h and m are as defined above, by reacting the active hydrogen of the compound (II) with one or some isocyanate groups of a polyisocyanate compound.

The active hydrogen-containing group represented by Z is, for example, hydroxyl, amino, etc. Such compounds wherein the active hydrogen-containing group is hydroxyl can be those exemplified as compounds of the formula (I) wherein Y is hydroxyl.

Exemplary of the polyisocyanate compound to be reacted with the compound (II) having the polymethylsiloxane chain are those already known, such as aromatic, alicyclic or aliphatic polyisocyanates including tolylene diisocyanate, xylene diisocyanate, phenylene diisocyanate, bis(isocyanatemethyl)cyclohexane, tetramethylene diisocyanate, hexamethylene diisocyanate, isophorone diisocyanate, hydrogenated diphenylmethane diisocyanate, diphenylmethane diisocyanate, polymers of the above exemplified polyisocyanates such as triisocyanurate, etc. Also usable are compounds having a terminal isocyanate group and prepared by reacting a low-molecular-weight compound having active hydrogen, such as ethylene glycol, propylene glycol, trimethylolpropane, hexanetriol or castor oil, with an excess of such a polyisocyanate compound. Among these polyisoyanate compounds, especially desirable is isophorone diisocyanate.

Depending on the kind and proportion of each of the compound (II) having a polymethylsiloxane chain and the polyisocyanate compound reacted therewith, Y in the formula (I) represents a monovalent or bivalent group having one or two free isocyanate groups and represented by —R₁—NCO, or —R₃(NCO)₂, wherein R₁, R₂ and R₃ each means a coupled portion resulting from the reaction of at least one isocyanate group of the polyisocyanate compound with the active hydrogen-containing group of the compound (II), in combination with the portion of the polyisocyanate compound other than the remaining free isocyanate group or groups.

For example, Y which is —R₁—N=C=O results from the reaction of 1 mole of a diisocyanate compound with 1 mole of a compound (II) having one polymethylsiloxane chain and one group (e.g. hydroxyl) having active hydrogen, and R₁ in the group Y represents a coupled portion (e.g. —NHCOO—) obtained by the reaction of one isocyanate group in the diisocyanate compound with the active hydrogen-containing group (e.g. —OH) of the compound (II), as combined with the portion of the diisocyanate compound other than the remaining free isocyanate group.

Similarly, Y which is results, for example, from the reaction of 1 mole of a triisocyanate compound with 2 moles of a compound (II) having one polymethylsiloxane chain and one group (e.g. hydroxyl) having active hydrogen, and R₂ in the group Y represents a coupled portion obtained by the reaction of two isocyanate groups in the triisocyanate compound with the active hydrogen-containing group of the compound (II), as combined with the portion of the triisocyanate compound other than the remaining free isocyanate group.

Further Y which is —R₃—(N=C=O )₂ results, for example, from the reaction of 1 mole of a triisocyanate compound with 1 mole of a compound (II) having one polymethylsiloxane chain and one group (e.g. hydroxyl) having active hydrogen, and R₃ in the group Y represents a coupled portion of one isocyanate group in the triisocyanate compound and the active hydrogen-containing group of the compound (II), as combined with the portion of the triisocyanate compound other than the remaining two free isocyanate groups.

An example of silicone compound (b) wherein Y is can be prepared from an adduct obtained from 3 moles of 1,6-hexamethylene diisocyanate and 1 mole of hexanetriol, by reacting 2 moles of a silicone compound having one hydroxyl group and one polymethylsiloxane chain in the molecule with one mole of the adduct. The silicone compound thus prepared has one isocyanate group and two polymethylsiloxane chains in the molecule.

An example of silicone compound (b) wherein Y is —R₃—(N=C=O)₂ can be prepared from an adduct obtained from 3 moles of 1,6-hexamethylene diisocyanate and 1 mole of trimethylolpropane, by reacting 1 mole of a silicone compound having one hydroxyl group and one polymethylsiloxane chain in the molecule with one mole of the adduct. The silicone compound (b) thus prepared has two isocyanate groups and one polymethylsiloxane chain in the molecule.

The component (b) is preferably about 520 to about 60000, more preferably about 800 to about 20000, in number average molecular weight. If the molecular weight is smaller than the above range, a reduced effect to prevent icing tends to result, whereas if it is greater than the above range, the compound (b) tends to become less compatible with the component (a) and less reactive.

Known polyisocyanate compounds are usable as the component (c) of the present composition. Examples of useful polyisocyanate compounds are aromatic, alicyclic or aliphatic polyisocyanate compounds such as tolylene diisocyanate, xylylene diisocyanate, phenylene diisocyanate, bis(isocyanatemethyl)cyclohexane, tetramethylene diisocyanate, hexamethylene diisocyanate, isophorone diisocyanate, hydrogenated diphenylmethane diisocyanate, diphenylmethane diisocyanate, polymers of the above polyisocyanates such as triisocyanurate, compounds having a terminal isocyanate group and prepared by reacting a low-molecular-weight compound having active hydrogen, such as ethylene glycol, propylene glycol, trimethylolpropane, hexanetriol or castor oil, with an excess of such a polyisocyanate compound, and polyisocyanate compounds obtained by blocking such unblocked polyisocyanate compounds with an isocyanate blocking agent. Preferable among these polyisocyanate compounds are tetramethylene diisocyanate, hexamethylene diisocyanate, compounds having a terminal isocyanate group and prepared by reacting trimethylol propane and tetra- or hexa-methylene diisocyanate, and polyisocyanate compounds obtained by blocking the above unblocked polyisocyanate compounds with an isocyanate blocking agent.

Examples of useful isocyanate blocking agents are phenols such as phenol, m-cresol, xylenol and thiophenol, alcohols such as methanol, ethanol, butanol, 2-ethylhexanol, cyclohexanol, ethylene glycol monomethyl ether, active hydrogen-containing compounds such as caprolactam, ethyl acetoacetate and diethyl malonate.

With the use of the blocked polyisocyanate serving as the component (c) the coating composition of the present invention, which would otherwise be of the three-package type, can then be of the two-package type, or can be of the single-package type instead of the two-package type.

According to the invention, the component (b), when having incorporated therein a group which is reactive with the hydroxyl or other reactive group in the component (a), may be grafted to the component (a) to obtain a graft copolymer (d) which comprises the component (a) having as a side chain thereof the polymethylsiloxane chain of the component (b). The graft copolymer (d) is then usable with the component (c) in place of the components (a) and (b) to obtain an anti-icing coating composition of the invention.

In reacting the component (b) with the component (a) for grafting, it is desirable to react 1 to 40 parts by weight of the component (b) with 30 to 90 parts by weight of the component (a). When the reaction ratio is outside this range, the component (a) or (b) fails to fully exhibit its advantage to result in a tendency toward reduced ability to prevent icing. It is especially desirable to react 3 to 30 parts of the component (b) with 40 to 80 parts by weight of the component (a).

The grafting method differs with the kind of reactive groups in the components (a) and (b) and can be a known one.

For example, the hydroxyl group of the copolymer (a) is reacted with the isocyanate group in the silicone compound (b) for grafting by the following process. First, 1 mole of a diisocyanate compound is reacted with heating with 1 mole of a compound (II) having one polymethylsiloxane chain and one hydroxyl group in the molecule in the presence of an organic metal catalyst to obtain a silicone compound (b) having one polymethylsiloxane chain and one free isocyanate group.

The silicone compound (b) is then reacted with the copolymer (a) which contains an excessive amount of hydroxyl groups relative to the isocyanate group in the component (b) with heating in the presence of an organic metal catalyst to effect grafting. This reaction gives a comb-shaped polymer comprising the copolymer (a) having hydroxyl with the silicone compound (b) grafted thereto as a side chain. Examples of organic metal catalysts for use in the above reactions are dibutyl tin acetate, dibutyl tin laurate and like organic tin compounds, zinc octylate and like organic zinc compounds.

When the components (a) and (b) are used without grafting, it is especially preferable that the component (b) have isocyanate as a reactive group from the viewpoint of reactivity of the component (b) during curing.

Use of the graft copolymer of the components (a) and (b) results in higher compatibility and permits the coating to more readily contain the silicone component on the side chain of the component (a) as designed than when the components (a) and (b) are used without grafting.

With use of the graft copolymer, polymethylsiloxane chains are distributed throughout the coating uniformly, permitting the coating to retain an anti-icing property with good stability when exposed to weather over a prolonged period of time.

With use of the component (d) wherein the components (a) and (b) are combined together, the composition obtained can be of the two-package type. Further the blocked polyisocyanate compound, when used as the component (c), provides a composition of the single-package type.

The coating composition of the single-package type is usable without giving consideration to the pot lift thereof, remains free of gelation even if partly left unused and is therefore advantageous from the viewpoint of cost.

When the components (a), (b) and (c) are to be used according to the invention, it is desirable to use these components in the following proportions calculated as solids.

| Component (a) | 30-90 wt. % |
|---|---|
| Component (b) | 1-40 wt. % |
| Component (c) | 5-50 wt. % |

If the proportion of the component (a) is less than 30 wt. %, the coating tends to exhibit lower physical strength, whereas if it exceeds 90 wt. %, increased icing strength is likely to result.

When less than 1 wt. % of the component (b) is used, the composition tends to exhibit a reduced effect to prevent icing, whereas when containing more than 40 wt. % of the component (b), the composition has a tacky surface and exhibits lower physical strength, giving coatings of lower crosslinking density, impaired physical properties and reduced adhesion to the substrate. On the other hand, with more than 50 wt. % of the component (c) present, the coating formed has too high a crosslinking density and is hard and brittle, further exhibiting a reduced anti-icing property. More preferable proportions are 40 to 80 wt. % of the component (a), 3 to 30 wt. % of the component (b) and 10 to 40 wt. % of the component (c).

When the graft copolymer (d) obtained by reacting the component (a) with the component (b), and the component (c) are to be used, it is desirable to use these components in the following proportions calculated as solids.

| Component (d) | 50-95 wt. % |
| Component (c) | 5-50 wt. % |

When the proportion of the component (c) is less than 5 wt. % (i.e., when the proportion of the component (d) exceeds 95 wt. %), the coating tends to exhibit impaired physical properties and lower adhesion to the substrate, whereas with more than 50 wt. % of the component (c) present (i.e. with less than 50 wt. % of the component (d) present), the resulting coating tends to become hard and brittle and exhibits a reduced anti-icing property. More preferable proportions are 60 to 90 wt. % of the component (d) and 10 to 40 wt. % of the component (c).

The anti-icing coating composition of the present invention comprises the components (a), (b) and (c) or the components (d) and (c) as its essential vehicle components. When required, it is possible to incorporate into the composition known coloring pigments, extender pigments corrosion inhibiting pigments, dyes, etc. which are generally used for coating compositions, in an amount of up to about 120 parts by weight per 100 parts by weight, calculated as solids, of the combined amount of the components (a), (b) and (c), or (d) and (c). Also usable is liquid paraffin or like paraffin substance for permitting the coating to have more sustained ability to prevent icing and to reduce shear strength at the ice-coating interface. Further usable are other suitable surfactants and additives.

The essential components, when reactive with one another, are individually prepared to provide an anti-icing coating composition of the two- or three-package type. When not reactive, the components are mixed together to provide a composition of the single-package type. The components other than the essential ones may be mixed with the latter components when the single- or two-package composition is to be obtained. Otherwise, the additive components may be mixed with one of the essential components which are to be separately packaged. In the case of the two-package or three-package composition, the components are mixed together immediately before use. The components are mixed together by usal agitating or dispersing means such as dissolve, steel ball mill, pebble mill, sand mill, attrition mill or the like. For preparing the coating composition, the components are used as they are or as dissolved in a suitable organic solvent. The solvent is preferably one capable of dissolving the resin components, such as chain or cyclic hydrocarbons, ketones, esters, alcohols and like solvents which are used for common coating compositions. When unblocked isocyanate groups are present in the system, it is desirable to avoid the use of alcohol solvents.

The anti-icing coating composition of the invention is applied directly to metals, plastics, glass, wood materials, etc. and can also be applied as a top coat to coatings over such materials. Furthermore, the present composition can be applied in the form of a shaped laminate covering the surfaces of articles.

For coating, the present anti-icing composition can be applied using known methods or means such as spray coating, brush coating, roller coating, roll coating, dip coating, curtain flow coater and the like.

The present coating composition is applied usually to a thickness of about 5 to about 100 micrometers, preferably 10 to 50 micrometers, when dried. Satisfactory coatings can be obtained under suitably selected coating and drying conditions, for example, by drying at room temperature to about 300° C., preferably at 80° to 250° C., for about 30 seconds to about 40 minutes.

EXAMPLES

The invention will be described in detail with reference to the following examples, in which the parts and percentages are all by weight unless otherwise specified.

(a) Preparation of fluoroolefin copolymer

Preparation Example 1

Into a 1000-ml glass autoclave were placed 20 parts of hydroxypropyl vinyl ether (hereinafter referred to as "HPVE"), 64.3 parts of xylene, 21.4 parts of methyl isobutyl ketone and 0.36 part of N-dimethylbenzylamine, the interior air was replaced by nitrogen, 80 parts of vinylidene fluoride was further placed in, and the mixture was heated to 65° C. The internal pressure of the autoclave was 6.2 kg/cm$^2$G when the temperature became stabilized. Subsequently, 14.3 parts of xylene/methyl isobutyl ketone mixture (3/1 in weight ratio) having 0.9 part of azobisisobutyronitrile dissolved therein was added to the mixture to initiate polymerization. The system was maintained at 65° C. with stirring for 20 hours. Twenty hours after the initiation of the reaction, the internal pressure of the autoclave was 0.2 kg/cm$^2$G.

The reaction gave a varnish containing a fluoroolefin copolymer and having a solids content of about 50%. The hydroxy value of the copolymer (resin solids) was about 110.

Preparation Examples 2-5

Fluoroolefin copolymer varnishes were prepared in the same manner as in Preparation Example 1 with the exception of using the monomers given in Table 2 in the listed amounts (in parts) and following the procedure stated below in Preparation Example 3.

In this example, 11 parts of succinic anhydride and 0.1 part of zirconium naphthenate were added to 200 parts of the varnish obtained (100 parts of olefin copolymer calculated as solids), following by reaction at about 80° C. for 5 hours to give a fluoroolefin copolymer-containing varnish containing about 53% of solids and having carboxyl introduced into the copolymer. The copolymer obtained was about 55 in acid value and about 220 in hydroxy value.

TABLE 2

| | Preparation Example No. | | | | |
|---|---|---|---|---|---|
| | 1 | 2 | 3 | 4 | 5 |
| Vinylidene fluoride | 80 | | | | |
| Monochlorotrifluoroethylene | | | | 53 | |
| Tetrafluoroethylene | | | 56 | | 62 |
| Monofluoroethylene | | 72 | | | |
| 3-Hydroxypropylvinylether | 20 | | | | |
| 2-Hydroxyethyl vinyl ether | | 8 | 44 | 27 | |
| ω-Hydroxybutyl vinyl ether | | | | | 38 |
| Ethyl vinyl ether | | | | 13 | |
| Methyl vinyl ether | | 10 | | | |
| Cyclohexyl vinyl ether | | 10 | | | |
| Vinyl acetate | | | | | 7 |
| Succinic anhydride (per 100 parts of resin) | | | 11 | | |
| Hydroxy value (mg/KOH g-resin) | 110 | 51 | 220 (280)* | 172 | 183 |

*The value in the parentheses is the hydroxy value of the copolymer before it was reacted with succinic anhydride.

Preparation Example 6

With 190 parts (resin solids 100 parts) of the varnish of carboxyl-containing fluoroolefin copolymer obtained in Preparation Example 3 were admixed 100 parts of "Silaplane FMO511" (see Note 1) and 0.02 part of tetraethylammonium bromide, and the mixture was reacted at 120° C. for 4 hours to obtain a graft copolymer, which was 126 in hydroxy value.

Note 1

"Silaplane FMO511": brand name of gylycidyl-containing reactive silicone manufactured by Chisso Corporation, Japan, having a molecular weight of about 1000 and represented by the formula:

wherein, n is about 11 on the average.

Preparation Example 7

With 22 parts of isophorone diisocyanate were admixed 500 parts of "Silaplane FMO421" (see Note 2) and 0.05 part of dibutyl tin oxide, and the mixture was stirred at 80° C. for 3 hours for reaction, giving a silicone compound having one free isocyanate group.

To 200 parts (resin solids 100 parts) of the fluoroolefin copolymer varnish obtained in Preparation Example 5 was added 15.4 parts of the silicone compound prepared above, followed by reaction at 80° C. for 3 hours to obtain graft copolymer, which was 157 in hydroxy value.

Note 2

"Silaplane FMO421": brand name of hydroxyl-containing reactive silicone manufactured by Chisso Corporation, Japan, having a molecular weight of about 5000 and represented by the formula:

wherein n is about 65 on the average.

Example 1

With 18.8 parts of xylylene diisocyanate were admixed 500 parts of "Silaplane FMO421" and 0.05 part of dibutyl tin oxide, and the mixture was stirred at 80° C. for 3 hours for reaction, giving a silicone compound (b-1) having one free isocyanate group.

A coating composition of the three-package type was prepared which was composed of the fluoroolefin copolymer varnish obtained in Preparation Example 1, the silicone compound (b-1) obtained about and 75% hexamethylene diisocyanate disolved in n-butyl acetate. These components were mixed together in the fluoroolefin copolymer/silicone compound (b-1)/hexamethylene diisocyanate ratio by weight of 50/32/18 calculated as solids and immediately used for coating.

Example 2

With 59.6 parts of a trifunctional isocyanate (c-1) prepared by adducting 3 moles of hexamethylene diisocyanate to 1 mole of trimethylolpropane were admixed 1000 parts of "Silaplane FMO425" (Note 3) and 0.1 part of dibutyl tin oxide, and the mixture was reacted with stirring at 80° C. for 3 hours, giving a silicone compound (b-2) having two free isocyanate groups.

A coating composition of the three-package type was prepared which was composed of the fluoroethylene copolymer obtained in Preparation Example 2, the silicone compound (b-2) prepared above and "Coronate #2906" (Note 4). These components were mixed together in the fluoroolefin copolymer/silicone compound (b-2)/"#2096" ratio by weight of 83/4/13 calculated as solids and immediately used for coating.

Note 3

"Silaplane FMO425": brand name of hydroxyl-containing reactive silicone manufactured by Chisso Corporation, Japan, having a molecular weight of about 10000 and represented by the formula:

wherein n is about 133 on the average.

Note 4

"Coronate #2096": isocyanurate which is trimer of hexamethylene diisocyanate, product of Nippon Polyurethane Co., Ltd.

Examples 3-6

Coating compositions were prepared from the components listed in Table 3 in the same manner as in Example 1 and used for coating. Each of the compositions was of the two-package type comprising the component (d) or mixture of components (a) and (b), and component (c).

Example 7

The trifunctional isocyanate (c-1) used in Example 2 was blocked with ω-caprolactam to obtain a blocked isocyanate (c-2), which was admixed with the component given in Table 3 in the listed ratio. The resulting composition was used for coating. The composition was of the single-package type and exhibited good storage stability.

Examples 8 and 9

Isophorone diisocyanate was blocked with ω-caprolactam to obtain a blocked isocyanate (c-3), which was admixed with the component or components given in Table 2 in the listed ratios. The compositions obtained were used for coating. These compositions were of the single-package type and were satisfactory in storage stability.

TABLE 3

| | Example No. | | | | | | | | |
|---|---|---|---|---|---|---|---|---|---|
| | 1 | 2 | 3 | 4 | 5 | 6 | 7 | 8 | 9 |
| Component (a) or (d) (Prep. Ex. No.) | 1 | 2 | 3 | 4 | 6 | 7 | 7 | 6 | 3 |
| Amount (solids) parts | 50 | 83 | 49 | 60 | 80 | 64 | 54 | 68 | 34 |
| Component (b) | (b-1) | (b-2) | Silaplane FMO411 (*3) | Silaplane FMO425 | — | — | — | — | Silaplane FMO411 (3*) |
| Amount (solids) parts | 32 | 4 | 26 | 10 | — | — | — | — | 33 |
| Component (c) | HMDI (*1) | Coronate #2096 | IPDI (*2) | Coronate #2096 | IPDI (*2) | (c-1) | (c-2) | (c-3) | (c-3) |
| Amount (solids) parts | 18 | 13 | 25 | 30 | 20 | 36 | 46 | 32 | 33 |
| Type (*4) | 3 | 3 | 2 | 2 | 2 | 2 | 1 | 1 | 1 |

In Table 3, the marks (*1) to (*3) stand for the following.
(*1) HMDI: hexamethylene diisocyanate
(*2) IPDI: isophorone diisocyanate
(*3) "Silaplane FMO411": hydroxyl-containing reactive silicone manufactured by Chisso Corporation, Japan, having a molecular weight of about 1000 and represented by the formula:

wherein n is about 11 on the average.

The numbers listed for "Type" in Table 3 represent the following:
1: single-package type
2: two-package type
3: three-package type

Comparative Example 1

(Composition disclosed in Unexamined Japanese Patent Publication SHO 61-23656)

m-Xylene hexafluoride (400 parts) was placed into a reactor, the air in the reactor was replaced by nitrogen, and the fluoride was heated to the reflux temperature. A solution of 12 parts of azobisisobutyronitrile in 600 parts of 2-perfluoroisononylethyl methacrylate was then added to the fluoride over a period of about 3 hours. While the mixture was maintained at the reflux temperature, 2 parts of azobisisobutyronitrile was added to the mixture every hour 4 times, and the mixture was further reacted for 2 hours. After the completion of the reaction, 800 parts of trichlorotrifluoroethane and 1200 parts of m-xylene hexafluoride were added to the reaction mixture, giving a colorless transparent solution (A) of 2-perfluoroisononylethyl methacrylate homopolymer containing 20.2% of solids and having a viscosity (Gardner bubble viscosity, 25° C., the same as hereinafter) of A.

The polymer solution (A) obtained (100 parts, or 20.2 parts in solids content) was added to 100 parts (solids 45 parts) of an acrylic resin coating composition, clear, of the organic solvent type ("Acric No.1000," product of Kansai Paint Company, Ltd., solids 45%, dryable at ordinary temperature), and the mixture was agitated in a mixer to obtain a coating composition, which was then used for coating.

Comparative Example 2

A coating composition was prepared from the fluoroolefin copolymer varnish obtained in Preparation Example 1 and hexamethylene diisocyanate in the copolymer/diisocyanate ratio of 50/18 in the same manner as in Example 1 with the exception of not using any silicone compound (b-1). The composition was used for coating.

Comparative Example 3

A clear coating composition (brand name "Fucaron #3000," product of Kansai Paint Company, Ltd., comprising polyvinylidene fluoride/acrylic resin in the ratio of about 70/30) was prepared and used for coating.

Preparation of test panels for measuring icing strength

Aluminum panels treated with chromium phosphate were coated with each of the compositions obtained in Examples 1 to 9 and Comparative Examples 1 to 3 to a dry thickness of about 25 micrometers using an applicator and then dried to obtain test panels for measuring icing strength. The compositions of Examples 1 to 9 and Comparative Example 2 were dried at 120° C. for 30 minutes, the composition of Comparative Example 1 was dried at room temperature, and the composition of Comparative Example 3 was dried at 220° C. for 20 minutes.

Test panels were prepred from a laminate of polytetrafluoroethylene film (product of Chukoh Kasei Co., Ltd., Japan) for Comparative Example 4, and from a laminate of polyvinyl fluoride film (brand name "Tedlar," product of Du Pont) for Comparative Example 5.

The panels thus prepared were tested for icing shear strength initially, after outdoor exposure for 3 months and after immersion in running water for 45 days. Table 4 shows the results.

Preparation of test panels for determining physical properties

Coated panels were prepared from zinc-plated steel panels having a thickness of 0.35 mm and treated with zinc phosphate, by coating each panel with "KP Color 8472 Primer" (brand name of epoxy resin primer, product of Kansai Paint Company, Ltd.) to a thickness of 5 micrometers, baking the coating at the maximum temperature of 200° C. for 30 seconds, coating the resulting panel with "KP Color 1573 Blue" (brand name of polyester top-coat composition, product of Kansai Paint Company, Ltd.) to a thickness of 17 micrometers and baking the coating at the maximum temperature of 210° C. for 45 seconds.

The compositions of Examples 1 to 9 and Comparative Examples 1 to 3 were applied to the coated panels to a dry thickness of 17 micrometers to obtain three-coat coated panels. The compositions of Examples 1 to 9 and Comparative Example 2 were baked at the maximum temperature of 230° C. for 90 seconds, the composition of Comparative Example 1 was dried at room temperature, and the composition of Comparative Example was baked at the maximum temperature of 250° C. for 90 seconds.

The three-coat coated panels thus obtained were tested for physical properties with the results given in Table 4.

TABLE 4

| Item | Example | | | | | | | | | Comparative Example | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 |
| Icing shear strength kg/cm$^2$ (*5) | | | | | | | | | | | | | | |
| Initial | 0.8 | 1.0 | 1.2 | 1.0 | 0.8 | 0.9 | 1.2 | 0.8 | 1.0 | 1.3 | 5.5 | 2.2 | 1.7 | 3.0 |
| After outdoor exposure | 0.9 | 1.2 | 1.2 | 1.1 | 1.0 | 1.1 | 1.2 | 1.2 | 1.1 | 2.5 | 10.0< | 3.2 | 2.0 | 7.7 |
| After immersion in water | 0.7 | 1.5 | 1.3 | 1.2 | 1.0 | 1.3 | 1.4 | 1.2 | 1.3 | 3.0 | 10.0< | 3.6 | 2.2 | 10.0< |
| Properties (*6) | | | | | | | | | | | | | | |
| Erichsen cross-cut test (*7) | 5 | 5 | 5 | 5 | 5 | 5 | 5 | 5 | 5 | 3 | 5 | 3 | — | — |
| Du Pont impact test (*8) | | | | | | | | | | | | | | |
| Indentation | 5 | 5 | 5 | 5 | 5 | 5 | 5 | 5 | 5 | 2 | 5 | 4 | — | — |
| Protuberance | 5 | 5 | 5 | 4 | 5 | 5 | 5 | 5 | 5 | 1 | 5 | 4 | — | — |
| Bending resistance (*9) | | | | | | | | | | | | | | |
| 2T | 5 | 4 | 5 | 4 | 5 | 5 | 5 | 5 | 5 | 1 | 5 | 4 | — | — |
| 4T | 5 | 5 | 5 | 4 | 5 | 5 | 5 | 5 | 5 | 2 | 5 | 4 | — | — |

The properties listed in Table 4 were determined by the following test methods.

(*5) Icing shear strength test

Figure 1:
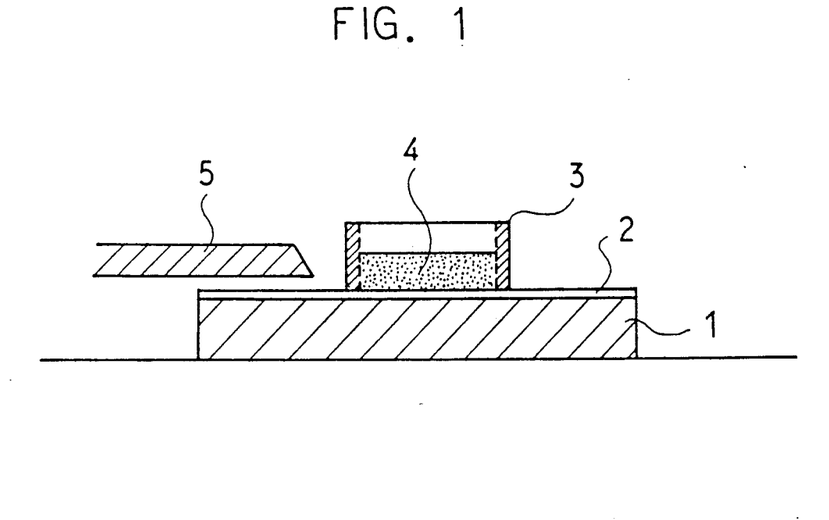
The drawing shows a device used for conducting the icing shear strength test described in the examples.

The accompanying drawing is a diagram in section showing a device used for conducting this test.

A stainless steel ring 3 (5 cm$^2$ in inner area) was placed on a coating 2 formed on a stainless steel plate 1 by applying the test composition. Then the plate 1 with the ring 3 was placed into a constant temperature bath at −10° C. and cooled for 90 minutes. A 2 ml quantity of water deionized by distillation and maintained at 5° C. was poured into the inside of the ring 3 to form ice 4 on the surface of the coating 2 which was then left to stand at −10° C. for 2 hours and was then tested by a load cell (not shown). Impact was applied to the ring 3 by a power-driven operating rod (axle) 5 made of metal to measure the icing shear strength (kg/cm$^2$) at which the ice 4 was separated from the coating 2.

(*6) The following criteria were used in evaluating the results obtained by the properties test.
5: No separation of coating
4: Less than 5% of separation of coating
3: Five to less than 20% of separation of coating
2: Twenty to less than 50% of separation of coating
1: More than 50% of separation of coating (*7) Erichsen cross-cut test Eleven straight cut lines were formed at a spacing of 1 mm both vertically and horizontally in the coating of the test panel to the surface of the substrate using a cutter knife to form 100 squares. The panel was then forced outward by 6 mm centrally of the cross-cut pattern from the rear side thereof with a steel ball, 10 mm in diameter, using an Erichsen tester, a cellophane adhesive tape was then adhered to the forced-out portion, and the tape was thereafter peeled off instantaneously. The ratio of the remaining squares at the forced-out portion was determined.

(*8) Du Pont impact test

Impact was applied to the test panel on the front side and rear side thereof over an area with a diameter of ½ inch by dropping a weight weighing 500 g onto the panel from a level 50 cm thereabove using a Du Pont impact tester. A cellophane adhesive tape was then adhered to the impact applied portions and thereafter peeled off instantaneously. The ratio of the remaining squares at the portions was determined.

(*9) Bending resistance

The test panel was bent through 180 degrees with the coated side out using a vice. A cellophane adhesive tape was adhered to the bent portion and then peeled off instantaneously. The ratio of the squares remaining on the bent portion was determined. The panel was bent with two 0.35-mm-thick iron sheets positioned on the inner side of the panel (listed as "2T") or with four such iron sheets similarly positioned (listed as "4T").

I claim:

1. An anti-icing coating composition comprising as vehicle components:
(a) a copolymer having hydroxyl, or hydroxyl and a reactive group other than hydroxyl comprised of units from a fluoroolefin monomer and a vinyl monomer, the vinyl monomer having hydroxyl,
(b) a silicone compound represented by the formula wherein n is an integer of 6 to 300, k is an integer of 0 to 6, h is 0 or 1, m is an integer of 0 to 6, Y is (a) hydroxyl, or (b) a group reactive with the hydroxyl or the reactive group in the copolymer (a) and is selected from the group consisting of carboxyl, epoxy and a monovalent or divalent group containing one or two free isocyanate groups, and j is 1 when Y is a hydroxyl or other monovalent group and j is 2 when Y is a divalent group and
(c) a polyisocyanate compound different from component (b).

2. A composition as defined in claim 1 wherein the reactive group of the copolymer (a) consists of hydroxyl.

3. A composition as defined in claim 1 wherein the copolymer (a) is a copolymer having hydroxyl, and carboxyl, epoxy or a mixture of carboxyl and epoxy groups as reactive group or groups other than hydroxyl.

4. A composition as defined in claim 1 wherein the fluoroolefin constituting the copolymer (a) is at least one compound selected from the group consisting of hexafluoropropene, tetrafluoroethylene, monochlorotrifluoroethylene, dichlorodifluoroethylene, 1,2-difluoroethylene, vinylidene fluoride and monofluoroethylene.

5. A composition as defined in claim 1 wherein the hydroxyl-containing vinyl monomer is at least one compound selected from the group consisting of hydroxyethyl vinyl ether, hydroxypropyl vinyl ether, hydroxybutyl vinyl ether, hydroxyhexyl vinyl ether, hydroxypentyl vinyl ether, 2-hydroxyethyl acrylate, 2-hydroxyethyl methacrylate, hydroxypropyl acrylate, hydroxypropyl methacrylate, hydroxybutyl acrylate and hydroxybutyl methacrylate.

6. A composition as defined in claim 1 wherein the copolymer (a) has a number average molecular weight of 2000 to 100000.

7. A composition as defined in claim 1 wherein the copolymer (a) has hydroxyl, and the silicone compound (b) has as Y a carboxyl or a monovalent or divalent group having one or two free isocyanate groups.

8. A composition as defined in claim 1 wherein the copolymer (a) has hydroxyl and carboxyl, and the silicone compound (b) has as Y a carboxyl, epoxy or hydroxyl or a monovalent or divalent group having one or two free isocyanate groups.

9. A composition as defined in claim 1 wherein the copolymer (a) has hydroxyl and epoxy, and the silicone compound (b) has as Y a carboxyl or a monovalent or divalent group having one or two free isocyanate groups.

10. A composition as defined in claim 1 wherein the silicone compound (b) has a number average molecular weight of about 520 to about 60000.

11. An anti-icing coating composition comprising as vehicle components:
(c) a polyisocyanate compound; and
(d) a graft copolymer having side chains of polymethyl siloxane prepared by reacting:
 (a) a copolymer having hydroxyl, or hydroxyl and a reactive group other than hydroxyl comprised of a fluoroolefin monomer and a vinyl monomer, the vinyl monomer having hydroxyl, and
 (b) a silicone compound represented by the formula:

wherein n is an integer of 6 to 300, k is an integer of 0 to 6, h is 0 or 1, m is an integer of 0 to 6, Y is (a) hydroxyl, or (b) a group reactive with hydroxyl or the reactive group consisting of a monovalent or divalent group containing one or two more free isocyanate groups, and j is 1 when Y is a hydroxyl or other monovalent group and j is 2 when Y is a divalent group, said polyisocyanate compound (c) is different from component (b).

12. A composition as defined in claim 1 wherein the polyisocyanate compound (c) is a blocked polyisocyanate compound.

* * * * *

UNITED STATES PATENT AND TRADEMARK OFFICE
CERTIFICATE OF CORRECTION

PATENT NO. : 5,045,599

DATED : September 3, 1991

INVENTOR(S) : Heihachi MURASE

It is certified that error appears in the above-identified patent and that said Letters Patent is hereby corrected as shown below:

On the cover page, Item [73], line 2, "Kyogo" should read -- Hyogo --.

Signed and Sealed this

Twelfth Day of January, 1993

Attest:

DOUGLAS B. COMER

*Attesting Officer*  *Acting Commissioner of Patents and Trademarks*